(12) United States Patent
Meunier (10) Patent No.: US 8,879,354 B2
(45) Date of Patent: Nov. 4, 2014

(54) METHOD OF ACQUIRING VIBROSEISMIC DATA CONCERNING A ZONE OF THE SUBSOIL, AND SEISMIC EXPLORATION METHOD INCLUDING SUCH A METHOD

(75) Inventor: Julien Meunier, Paris (FR)

(73) Assignee: Cggveritas Services SA, Massy Cedex (FR)

( * ) Notice: Subject to any disclaimer, the term of this patent is extended or adjusted under 35 U.S.C. 154(b) by 663 days.

(21) Appl. No.: 13/144,118

(22) PCT Filed: Jan. 12, 2010

(86) PCT No.: PCT/EP2010/050293
§ 371 (c)(1),
(2), (4) Date: Jul. 12, 2011

(87) PCT Pub. No.: WO2010/079236
PCT Pub. Date: Jul. 15, 2010

(65) Prior Publication Data
US 2011/0272207 A1 Nov. 10, 2011

(30) Foreign Application Priority Data
Jan. 12, 2009 (FR) .................................... 09 50134

(51) Int. Cl.
G01V 1/00 (2006.01)
G01V 1/36 (2006.01)
(52) U.S. Cl.
CPC .............. G01V 1/36 (2013.01); G01V 2210/32 (2013.01)
USPC .............................................. 367/38; 367/47
(58) Field of Classification Search
USPC ..................................................... 367/38, 47
See application file for complete search history.

(56) References Cited

U.S. PATENT DOCUMENTS

| 3,729,704 | A | * | 4/1973 | Farr .................................... 367/9 |
| 4,308,597 | A | * | 12/1981 | Wilson ............................ 367/58 |
| 4,500,978 | A | | 2/1985 | Ziolkowski et al. |
| 4,556,962 | A | * | 12/1985 | Widrow .......................... 367/45 |
| 4,723,231 | A | | 2/1988 | Sallas |
| 4,829,487 | A | * | 5/1989 | Malloy ........................... 367/40 |
| 2002/0091487 | A1 | | 7/2002 | Moerig et al. |
| 2003/0231548 | A1 | * | 12/2003 | Gillard et al. .................... 367/40 |
| 2007/0104028 | A1 | * | 5/2007 | Van Manen et al. ............ 367/38 |
| 2010/0085836 | A1 | * | 4/2010 | Bagaini et al. .................. 367/41 |

OTHER PUBLICATIONS

Written Opinion of the International Searching Authority mailed on Apr. 9, 2010 in International Application No. PCT/EP2010/050293.
International Search Report mailed on Apr. 9, 2010 in International Application No. PCT/EP2010/050293.
J.E. Martin et al., entitled "The Behaviour of a Seismic Vibrator Using Different Phase Control Methods and Drive Levels"; First Break, Vol. 8, No. 11, Dated Nov. 1990; pp. 404-414.

* cited by examiner

*Primary Examiner* — Isam Alsomiri
*Assistant Examiner* — Hovhannes Baghdasaryan
(74) *Attorney, Agent, or Firm* — Patent Portfolio Builders PLLC (57) ABSTRACT

The invention concerns a method of acquiring vibroseismic data concerning a zone of the subsoil. This method comprises the following steps: —operating a vibroseismic source so that it transmits a first vibroseismic signal having a first amplitude (101, 201), —operating the source so that it transmits a second vibroseismic signal having a second amplitude different from the first amplitude (103, 203), —recording first data corresponding to the first signal after propagation in the medium to be explored (102, 202), —recording second data corresponding to the second signal after propagation in the medium to be explored (104, 204). The method supplies information for filtering the surface waves (ground roll).

12 Claims, 6 Drawing Sheets

METHOD OF ACQUIRING VIBROSEISMIC DATA CONCERNING A ZONE OF THE SUBSOIL, AND SEISMIC EXPLORATION METHOD INCLUDING SUCH A METHOD

The invention concerns the seismic exploration of an underground zone on land.

The use of seismic waves generated artificially for the imaging of geological layers has been used for more than 50 years. The most widely used waves are by far reflected waves and more precisely reflected compressional waves.

During seismic prospection operations, a vibrator equipment generates a vibroseismic signal that propagates in particular in the form of a wave that is reflected on interfaces of geological layers. These waves are received by geophones, which convert the displacement of the ground resulting from the propagation of the waves into an electrical signal recorded by means of recording equipment.

Analysis of the arrival times and amplitudes of these waves makes it possible to construct a representation of the geological layers on which the waves are reflected. One of the complications in terrestrial seismic surveys is that the reflected waves are not the only ones to be recorded. In particular, the wave associated with the largest proportion of energy is the surface wave that propagates along the surface of the ground. This wave is similar to the one that propagates on the surface of the water when for example a pebble is caused to fall on it. It is commonly referred to as "ground roll", a word which designates the rotation movement of the particles on the surface of the ground. The surface wave or ground roll interferes with the reflected waves and obscures their image.

There are other stray waves generated but they are in general less disturbing.

Hereinafter, the terms "surface waves" and "reflected waves" will be used to designate the parts of a seismogram respectively representing the corresponding waves.

There currently exist two main techniques for separating the surface waves in the recorded seismic data.

The most widespread technique used is an apparent-speed filtering that separates the slow surface waves from the more rapid reflected waves.

The second technique is that of the polarisation filter. Surface waves produce a circular movement of the surface of the ground whereas reflective waves produce a linear movement. It is this difference that is used by the polarisation filter.

It is also known (Martin, J. E., Jack, I. G. "The behaviour of a seismic vibrator using different phase control methods and drive levels" First Break, November 1990) that the variation in the level of the force generated by a vibrator is represented by a variation in the propagation times of the reflected waves. This variation in time is in general interpreted as a variation in propagation velocities in the compressed area under the plate of the vibrator.

It was observed that this variation in time was not identical for all types of waves. In particular, for the reflected waves used to obtain almost all the images in oil exploration seismics, this variation is obviously very small whereas for surface waves it may be much greater.

The present invention takes advantage of this observation.

According to a first aspect, an object of the invention is a method of acquiring vibroseismic data concerning an underground zone supplying the information for separating the surface wave components contained in the vibroseismic data.

According to this first aspect a method of acquiring vibroseismic data concerning an underground zone is provided, comprising the following steps:

operating a vibroseismic source so that it transmits a first vibroseismic signal having a first amplitude, operating the source so that it transmits a second vibroseismic signal having a second amplitude, different from the first amplitude, recording first data corresponding to the first signal after propagation in the medium to be explored, recording second data corresponding to the second signal after propagation in the medium to be explored.

The method proposed takes advantage of the difference in propagation time relating to the variation in the force level generated by the source. By virtue of this difference, an estimate of the surface waves can be derived from the first and second data with a view to filtering thereof.

The method can also be used for separating the compressional waves converted into shear waves in the case where these are recorded by means of 3-component geophones. This is because the phenomenon is associated with the source and affects indifferently the compressional waves that are reflected and those that are converted into shear waves.

Likewise, the method can be applied to the shear waves emitted by a shear wave source.

Furthermore, the method proposed applies directly to diffracted surface waves.

A method for the seismic exploration of an underground zone is provided according to a second aspect, comprising the following steps:

operating a vibroseismic source so that it transmits a first vibroseismic signal having a first amplitude, operating the source so that it transmits a second vibroseismic signal having a second amplitude different from the first amplitude, recording first data corresponding to the first signal after propagation in the medium to be explored, recording second data corresponding to the second signal after propagation in the medium to be explored, deriving an estimate of the surface waves contained in these data from the first and second data recorded, and subtracting this estimate from the first data.

DETAILED DESCRIPTION

Figure 1:
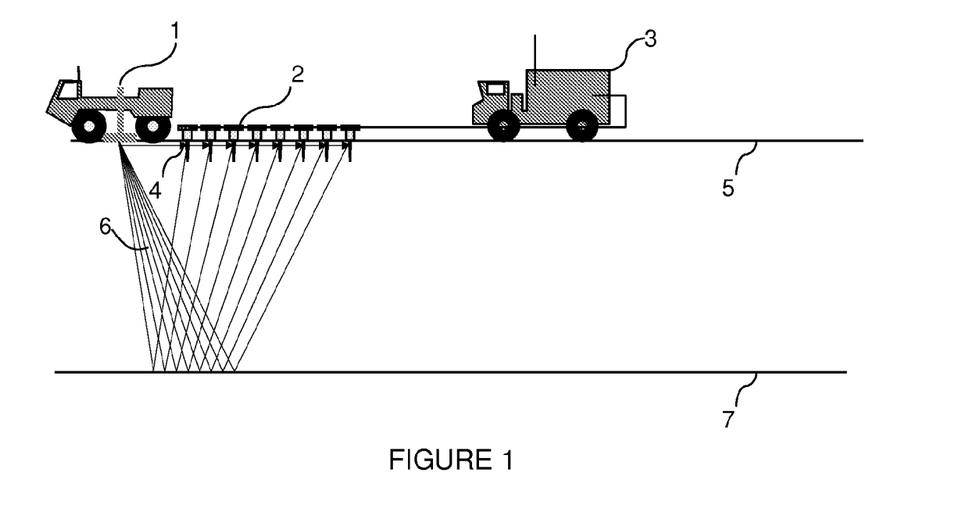
FIG. 1 depicts schematically a device for transmitting and receiving vibroseismic waves.

FIG. 1 depicts schematically a device for transmitting and receiving vibroseismic waves intended for seismic exploration in a land environment.

The device comprises a source consisting of a vibrator 1 operable to generate a seismic signal, a set of receivers 2 (or geophones) for receiving a seismic signal and converting it into an electrical signal and a recorder 3 for recording the electrical signals generated by the receivers. The source 1, the receivers 2 and the recorder 3 are positioned on the surface of the ground 5. FIG. 1 depicts a single vibrator but it should be understood that the source may be composed of several vibrators, as is well known to persons skilled in the art.

In operation, the source 1 is operated so as to generate a vibroseismic signal. This signal propagates firstly on the surface of the ground, in the form of surface waves 4, and secondly in the subsoil, in the form of waves 6 that generate reflected waves when they reach an interface 7 between two geological layers. Each receiver 2 receives both a surface wave 4 and a reflected wave 6 and converts them into an electrical signal in which are superimposed the component corresponding to the reflected wave and the one that corresponds to the surface wave, which is undesirable and which is to be filtered.

First Embodiment: Simplified Model

A simple model consists of describing a seismogram SR(t, d) derived from a signal transmitted by the vibroseismic source S with a force d and observed by the receiver R as a function of time t as the sum of two components associated respectively with the reflected waves P(t,d) and the surface waves G(t,d).

$$SR(t,d) = P(t,d) + G(t,d) \quad [1]$$

The variable d is used to designate a force so as to avoid confusion with the frequency. The variable d in reality designates the drive, that is to say the percentage of the maximum force available for a given type of vibrator. It is the drive that is used by land geophysicists to modify the force applied to the ground.

In this model, the variation in the force from b (low) to h (high) results in an identical variation in amplitude and a different variation in time for each of the two components:

$$SR(t, h) = P(t, h) + G(t, h) \quad [2]$$

$$SR(t, b) = P(t, b) + G(t, b) \text{ With} \quad [3]$$

$$P(t, b) = \frac{b}{h} \cdot P(t + \tau_P, h) \quad [4]$$

$$G(t, b) = \frac{b}{h} \cdot G(t + \tau_G, h) \quad [5]$$

where $\tau_P$ designates the delay of the low-amplitude component with respect to the high-amplitude component for the components associated with the reflected waves, and $\tau_G$ designates the delay of the low-amplitude component with respect to the high-amplitude component for the components associated with the surface waves.

By substitution, equation [3] becomes:

$$SR(t, b) = \frac{b}{h} \cdot [P(t + \tau_P, h) + G(t + \tau_G, b)] \quad [6]$$

Therefore:

$$SR(t - \tau_P, b) = \frac{b}{h} \cdot [P(t, h) + G(t + \tau_G - \tau_P, b)] \quad [7]$$

By difference with equation [2], there is obtained:

$$SR(t - \tau_P, b) - \frac{b}{h} SR(t, h) = \frac{b}{h} \cdot [G(t + \tau_G - \tau_P, b) - G(t, h)] \quad [8]$$

which can also be written:

$$SR(t - \tau_P, b) - \frac{b}{h} SR(t, h) = (\tau_G - \tau_P) \cdot \frac{dG(t, h)}{dt} \quad [9]$$

and by integration makes it possible to determine the surface wave $$G(t, h) = \frac{1}{(\tau_G - \tau_P)} \cdot \int \left[ SR(t - \tau_P, b) - \frac{b}{h} SR(t, h) \right] dt \quad [10]$$

Figure 8:
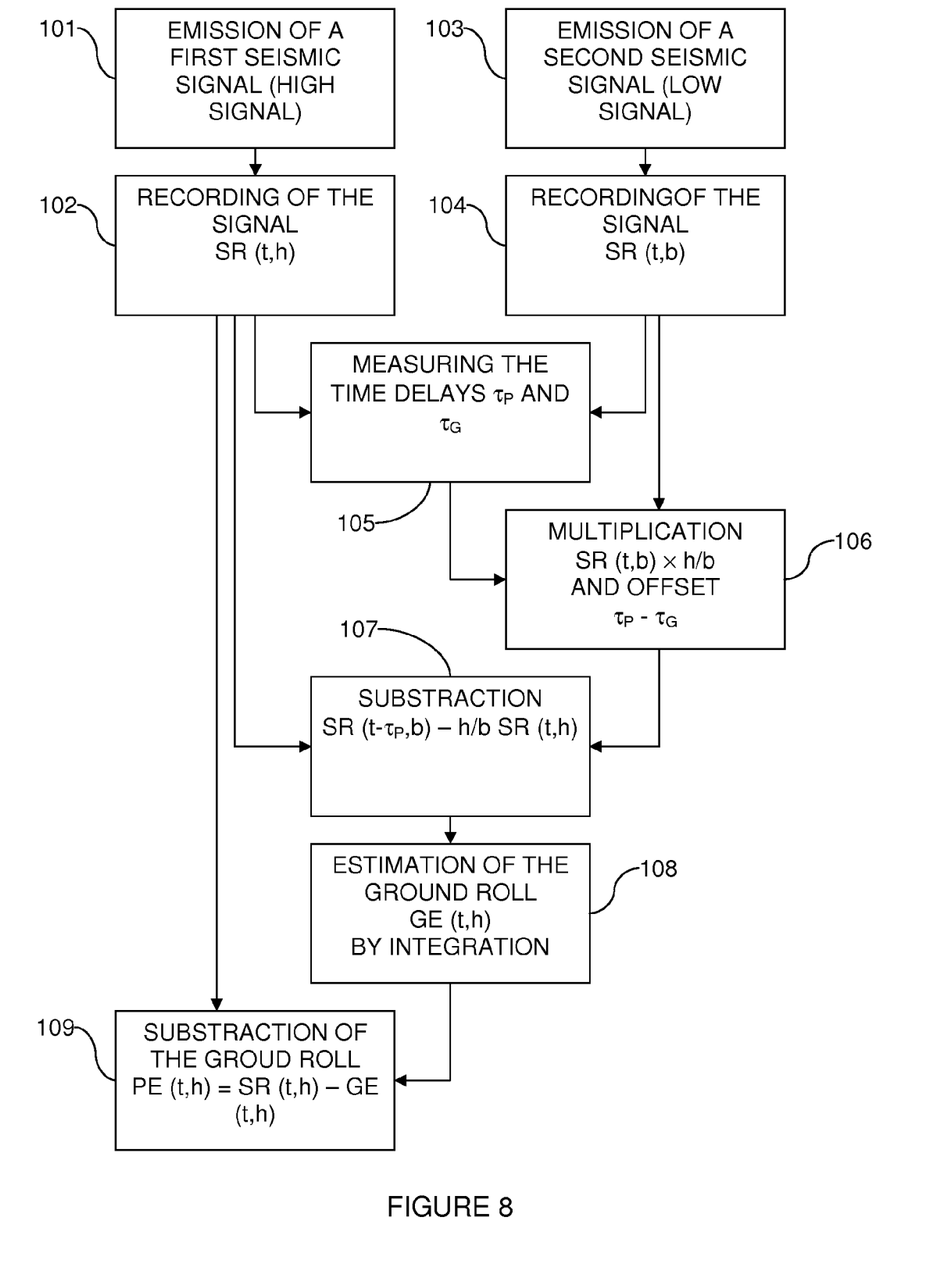
FIG. 8 depicts schematically steps of a seismic exploration method according to a first embodiment of the invention.

FIG. 8 depicts schematically steps of a seismic exploration method comprising a vibroseismic acquisition method according to the invention, composed of steps 101-104, and a method of filtering the surface waves, according to a first embodiment (105-109).

In a first step 101, the source 1 consisting of a vibrator is controlled so as to generate a first vibroseismic signal S1 (strong signal) having a first amplitude. This first amplitude is appropriately the optimum amplitude from the standpoint of seismic imaging. To this end, the vibrator is adjusted so as to apply vibrations to the ground with a first force level h (high level), for example with a drive d of 80%.

In a second step 102, the recorder 3 records first data.

Figure 3:
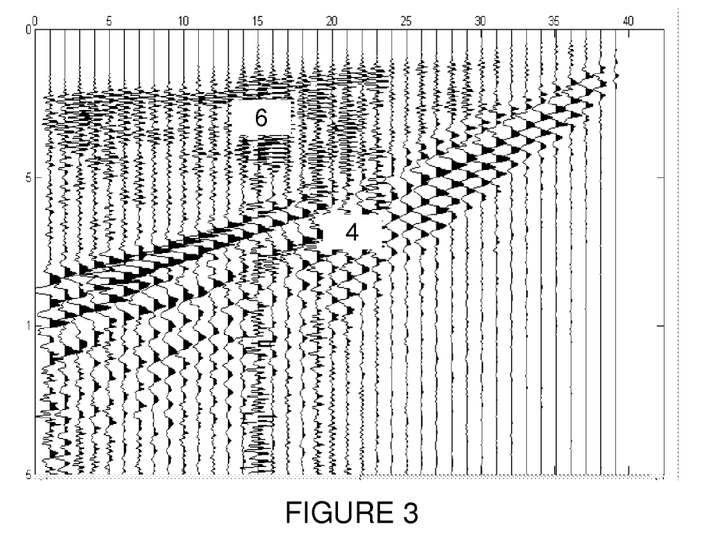
FIG. 3 is a diagram depicting schematically recordings obtained by the device in FIG. 1 after propagation of the second signal in the subsoil.

The first data recorded are shown in FIG. 3. These first data comprise a set of signals (or traces) recorded as a function of time and resulting from the propagation of the first seismic signal, each signal having been generated by a receiver 2.

The first data comprise data corresponding to surface waves 4 and data corresponding to reflected waves 6.

Figure 2:
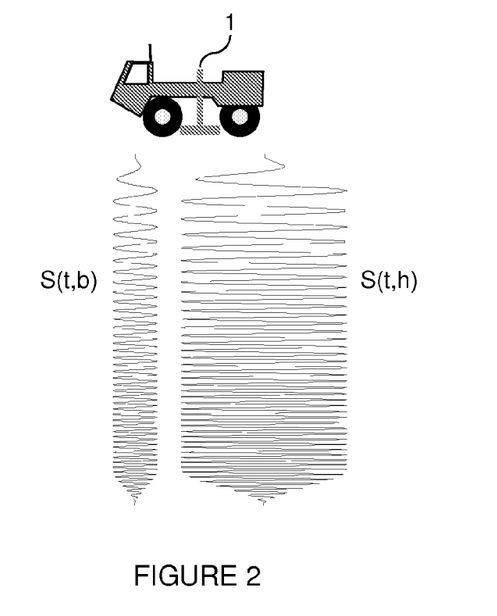
FIG. 2 depicts schematically a first signal (weak signal) and a second signal (strong signal) as transmitted by the device in FIG. 1.

In a third step 103, the vibrator 1 is controlled so as to generate a second vibroseismic signal S2 (weak signal) having a second amplitude. For this purpose, the vibrator is adjusted so as to apply vibrations to the ground with a second force level b (low level), for example with a drive d of 20%. The second signal S2 is identical to the first signal S1, except that it has an amplitude less than that of the signal S1, as shown in FIG. 2.

It should be noted that the terms "first" and "second" are used here only to distinguish on the one hand the signals emitted at the high level and on the other hand the signals emitted at the low level, as well as the data respectively recorded following these emissions. The terms "first" and "second" in no way indicate a chronological order. The order in which the two emissions take place and subsequently the recordings is indifferent in attaining the objectives of the invention. The emission of a high signal may precede that of a weak signal, or vice versa.

In a fourth step 104, the recorder 3 records second data.

In a fifth step 105, the delays $\tau_P$ and $\tau_G$ between the components P(t,h) and P(t,b) and between the components G(t,h) and G(t,b) are determined from the first and second data.

Figure 4:
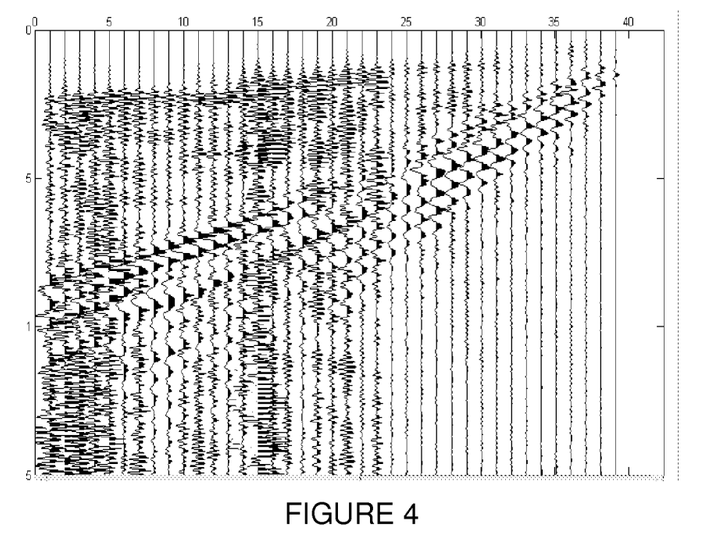
FIG. 4 is a diagram depicting schematically recordings obtained by the device in FIG. 1 after propagation of the first signal in the subsoil and equalisation.

In a sixth step 106, the second data are processed in the following manner: the amplitudes of the traces are multiplied by a factor $$\frac{h}{b}$$

and the traces are offset in time by $\tau_G - \tau_P$. FIG. 4 depicts the second data thus processed.

The effect of this sixth step is to transform the second data so that the reflected wave component P can be superimposed on the reflected wave components P contained in the first data. In other words, the reflected wave components P are referred to a common reference in the first and second data.

In a seventh step 107, the second data thus processed or transformed (FIG. 4) are subtracted from the first data (FIG. 3).

Figure 5:
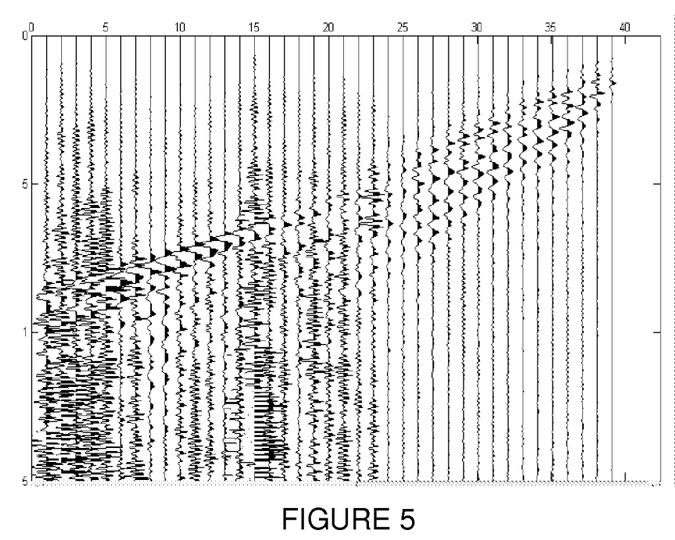
FIG. 5 is a diagram obtained by subtraction of the diagrams in FIGS. 3 and 4.

The effect of this seventh step is to eliminate the reflected wave components P. FIG. 5 shows schematically the subtracted data obtained by the subtraction step. It can be seen in this figure that the reflected waves have disappeared.

In an eighth step 108, the subtracted data are integrated with respect to time so as to obtain estimation data GE for the surface wave components (ground roll).

Figure 6:
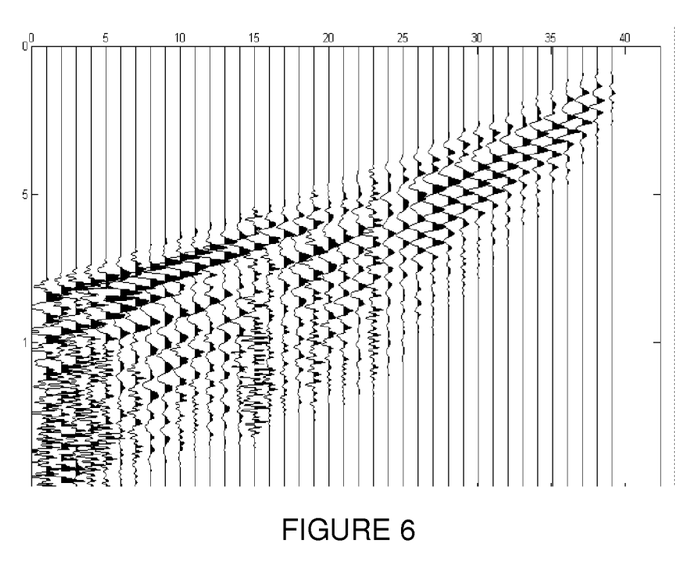
FIG. 6 is a diagram obtained after integration of the diagram in FIG. 5, corresponding to an estimation of the surface signals.
Figure 7:
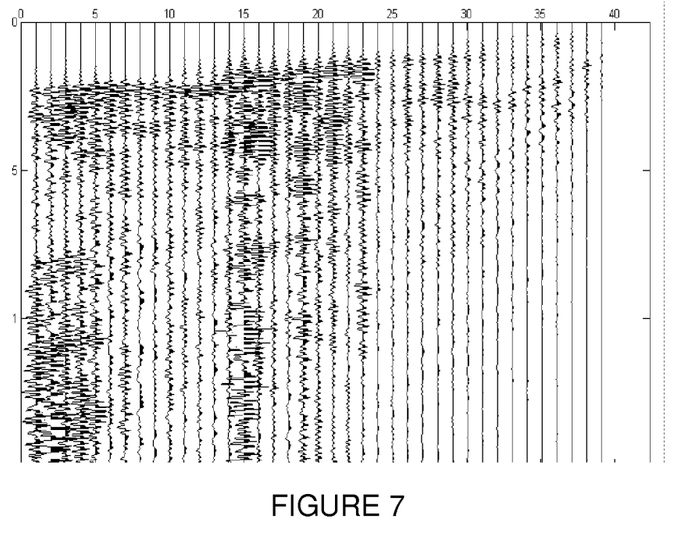
FIG. 7 is a diagram obtained after subtraction of the diagrams in FIGS. 3 and 6, corresponding to a recording in which the surface signals have been eliminated.

FIG. 6 shows schematically the estimation data GE.

In a ninth step (109), the estimation data of the ground roll (FIG. 6) are subtracted from the first data (FIG. 3) so as to eliminate the surface wave components.

This ninth step makes it possible to obtain an estimation PE of the data corresponding to the reflected waves. The ground roll has substantially disappeared.

The model corresponding to the first embodiment described above, based on a description of the effect of a variation in the force applied by equations [4] and [5], is a simplified model that does not take account of other types of wave present in the recordings, in particular the ambient noise (not generated by the source), and certain variables, such as the frequency, the azimuth and the inclination of the rays, which may have a significant impact on this effect.

To take account of these different variables, a second embodiment can be used, based on a more complex model.
Second Embodiment: Complex Model To take account of all the variables, it is possible to describe the phenomenon in the Fourier domain {f,kx,ky} where f represents the frequency, and kx and ky the wave numbers in horizontal directions X and Y.

In addition, in this domain, the effect of the ambient noise is easy to control and reduce.

To simplify the notations the variable f will merely be indicated in place of f,kx,ky.

By taking identical notations, equations [2] and [3] become:

$$SR(f,h)=P(f,h)+G(f,h) \quad [12]$$

$$SR(f,b)=P(f,b)+G(f,b) \quad [13]$$

At this stage, it is possible to calculate a change operator O1, for example by spectral division:

$$O1(f) = \frac{P(f, h)}{P(f, b)} \quad [14]$$

The most general operator depends on f,kx,ky, the most simple is a scalar.

The operator O1 is applied to the data SR(f,b) recorded with a low force b.

$$SR2(f,b)=SR(f,b)*O1(f) \quad [15]$$

By subtracting equation [14] from [11], a filtered estimation of the ground roll is obtained:

$$SR(f,h)-SR2(f,b)=GE(f,h)*(1-O1(f)) \quad [16]$$

The final estimation of the ground roll is obtained by application of a reverse filter.

$$GE(f, h) = \frac{SR(f, h) - SR2(f, h)}{1 - O1(f)} \quad [17]$$

It remains to subtract this estimation GE(f,h) of the ground roll from the data SR(f,h) in order to obtain an estimation PE(f,h) of the reflected waves.

$$PE(f,h)=SR(f,h)-GE(f,h) \quad [18]$$

Figure 9:
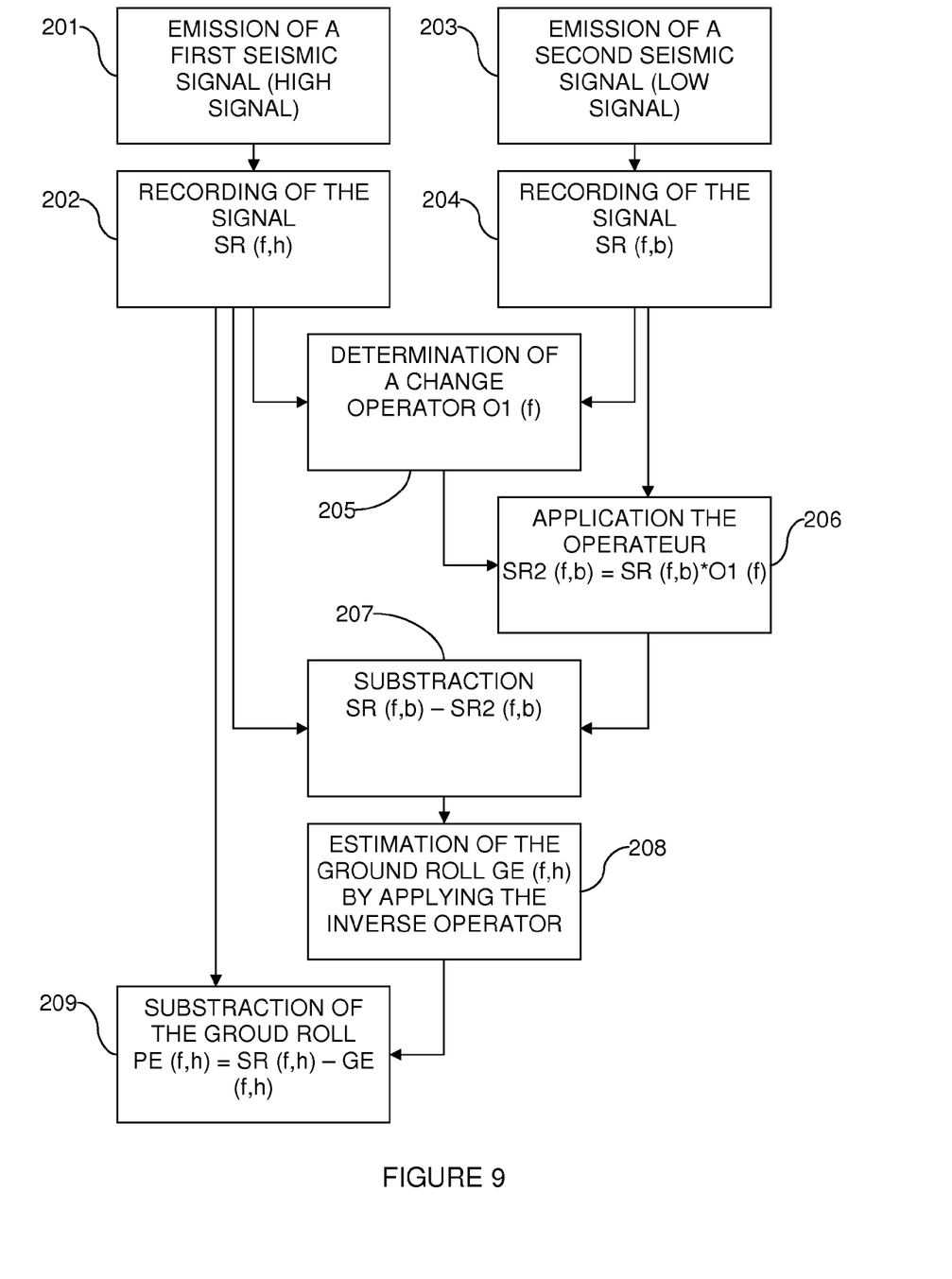
FIG. 9 depicts schematically steps of a seismic exploration method according to a second embodiment of the invention.

FIG. 9 schematically shows steps of a seismic exploration method comprising a vibroseismic acquisition method according to the invention, composed of steps 201-204, and a method of filtering the surface waves according to a second embodiment (steps 205-209).

According to a first step 201, the source 1 is controlled so as to generate a first seismic signal S1 (strong signal) having a first amplitude. For this purpose, the vibrator is adjusted so as to apply vibrations to the ground with a first force level h (high level), for example with a drive d of 80%.

According to a second step 202, the recorder 3 records first data.

The first data recorded are shown in FIG. 3. These first data comprise a set of signals (or traces) recorded as a function of time and resulting from the propagation of the first seismic signal, each signal having been generated by a receiver 2.

The first data comprise data corresponding to surface waves 4 and data corresponding to reflected waves 6.

According to a third step 203, the source 1 is controlled so as to generate a second signal S2 (weak signal) having a second amplitude. For this purpose, the vibrator is adjusted so as to apply vibrations to the ground with a second force level b (low level), for example with a drive d of 20%. The second signal S2 is identical to the first signal S1, except that it has an amplitude less than that of S1, as shown in FIG. 2.

In the case of the first embodiment, it should be noted that the terms "first" and "second" are used here only to identify in a practical fashion on the one hand the signals emitted at the high level and on the other hand the signals emitted at the low level, as well as the data respectively recorded following these emissions. The terms "first" and "second" in no way indicate a chronological order. The order in which the two transmissions take place, and consequently the recordings of the data, is indifferent in achieving the objects of the invention. The transmission of a high signal may precede that of a low signal, or vice versa.

According to a fourth step 204, the recorder 3 records second data.

According to a fifth step 205, a change operator O1(f) is derived from the first and second data (equation [14]). The derivation of the change operator is based on the fact that there generally exists zones in which the reflected waves P and the surface waves G do not interfere, or do not substantially interfere, and may be separated.

Using several seismograms associated with different receivers reduces the effect of strict non-compliance with the non-interference condition.

As required, calculation of the change operator may be the subject of an iteration, in a manner well known to persons skilled in the art.

According to a sixth step 206, the change operator O1(f) is applied to the second data (equation [15]).

According to a seventh step 207, the second data thus processed or transformed are subtracted from the first data.

The effect of this seventh step is to eliminate the reflected pressure wave components P. FIG. 5 depicts schematically the inverse Fourier transform of the subtracted data. It can be seen in this figure that the reflected waves have substantially disappeared.

According to an eight step 208, the inverse operator $$\frac{1}{1 - O1(f)}$$

is applied to the subtracted data so as to obtain estimated data GE for the surface wave components, or "ground roll".

FIG. 6 depicts schematically the inverse Fourier transform of the estimation data GE of the ground roll.

According to a ninth step 209, the estimation data of the ground roll (FIG. 6) are subtracted from the first data (FIG. 3), so as to eliminate the surface wave components.

This step makes it possible to derive an estimate PE of the data corresponding to the reflected waves. In this estimate, the ground roll has substantially disappeared.

It was noted above that, in the two embodiments described, the chronological order is indifferent: the transmission of the high-level signal may precede that of the low-level signal, or vice versa. With regard to the interval of time separating the two transmissions, several options are possible. The most simple for the separation of the two recordings is to perform the two transmissions and recordings sequentially, without overlap. It can nevertheless also be envisaged to reduce the interval between the transmissions, for improving the productivity of the operations, and have overlapping transmissions and recordings. In the latter case, it will be necessary to reduce the distortion due to the harmonic noise. This may be achieved in an appropriate fashion by the method described in the document FR 2845483.

The invention claimed is:

1. A method for acquiring vibroseismic data concerning a zone of the subsoil, the method comprising:
   operating a vibroseismic source to generate a first vibroseismic signal having a first amplitude;
   operating the vibroseismic source to generate a second vibroseismic signal having a second amplitude different from the first amplitude;
   recording first data corresponding to the first vibroseismic signal after propagation in the zone, for a location;
   recording second data corresponding to the second signal after propagation in the zone, for the location; and
   computing surface waves between the vibroseismic source and the location by integrating a difference between a first normalized trace at the location obtained using the first recorded data and a second normalized trace at the location using the second recorded data.

2. The method of claim 1, wherein the surface waves G(t,h) to be extracted from the at least one subset of the seismic data corresponding to the one of the two signals having a first amplitude, h, are calculated as $$G(t, h) = \frac{1}{\tau_G - \tau_P} \int \left[ SR(t - \tau_P, b) - \frac{b}{h} SR(t, h) \right] dt$$

where $\tau_P$ is a delay of components corresponding to reflected waves associated with the two signals, $\tau_G$ is a delay of components corresponding to surface waves associated with the two signals, SR(t,h) is a trace for the location extracted from the at least one subset of the seismic data corresponding to the one of the two signals having the first amplitude, h, and SR(t,b) is a trace for the location extracted from another subset of the seismic data corresponding to another of the two signals having a second amplitude, b.

3. The method according to claim 1, in which said first and second vibroseismic signals (S(t,h),S(t,b)) differ only by their amplitude.

4. The method according to claim 1, in which said first and second vibroseismic signals (S(t,h),S(t,b)) have different shapes and durations.

5. The method according to claim 1, in which said first and second vibroseismic signals are transmitted sequentially.

6. The method according to claim 1, in which said first and second vibroseismic signals are transmitted so as to be in overlap.

7. The method according to claim 1, in which the first and second recorded data contain reflected wave components (P(t,h), P(t,b)), resulting from a reflection of the first and second vibroseismic signals in the zone, and the surface waves (G(t,h)) resulting from a propagation of the first and second vibroseismic signals on a surface of the zone, wherein the obtaining comprises:
   transforming the second data to equalize the reflected wave component (P(t,b)) of the second data with the reflected wave component (P(t,h)) of the first data; and
   subtracting the second transformed data (SR2(t,b)) from the first data.

8. The method according to claim 7, in which the transforming of the second data comprises:
   multiplying the second data (SR(t,b)) by a coefficient (h/b) equal to a ratio of the first amplitude and the second amplitude, and
   offsetting the second data (SR(t,b)) by an offset time ($\tau_P - \tau_G$) to refer the reflected wave components contained in the first and second data to a common temporal reference.

9. Method according to claim 8, further comprising:
   measuring the offset time ($\tau_P - \tau_G$) between the second and first data.

10. A method for the seismic exploration of a zone of the subsoil, comprising:
   operating a vibroseismic source to generate a first vibroseismic signal having a first amplitude;
   operating the vibroseismic source to generate a second vibroseismic signal having a second amplitude different from the first amplitude;
   recording first data (SR(t,h)) and second data (SR(t,b)) corresponding respectively to the first vibroseismic signal and to the second vibroseismic signal after propagation thereof in the zone, for a predetermined location;
   obtaining an estimate of surface waves between the vibroseismic source and the predetermined location using the first and second recorded data; and
   subtracting the estimate from the first data,
   wherein the obtaining includes, in a frequency space:
   determining a change operator between the first and second data from portions of the first and second data in which reflected wave components and surface waves do not substantially interfere with each other, respectively, the change operator substantially equalizing a reflected wave component of the second data with a reflected wave component of the first data, applying a change operator ($O1(f)$) to the second data (SR(f,b)), calculating a filtered estimation of surface waves by subtracting the second data to which the change operator was applied, from the first data, and applying a reverse of the change operator to the filtered estimation of the surface waves to yield the estimate of the surface waves.

11. Method according to claim 10, in which the change operator ($O1(f)$) is a function depending on the frequency (f) and wave numbers (kx,ky) characterizing propagation of the first and second signals along horizontal directions in the zone.

12. The method of claim 10, wherein the estimate of the surface waves G(f,h) to be extracted from the first data corresponding to the first vibroseismic signal having a first amplitude, h, is obtained as $$G(f, h) = \frac{SR(f, h) - SR(f, b) * O1(f)}{1 - O1(f)}$$

where SR(f,h) is a spectra for the predetermined location extracted from the first data and SR(f,b) is a spectra for the predetermined location extracted from the second data corresponding to the second vibroseismic signal having a second amplitude, b, and the change operator $O1(f)$ represents a spectral change between the reflected wave components the first and second vibroseismic signals in the zone.

* * * * *